(12) United States Patent
Kim (10) Patent No.: US 7,892,136 B2
(45) Date of Patent: Feb. 22, 2011

(54) GEAR TRAIN OF AUTOMATIC TRANSMISSION FOR A VEHICLE

(75) Inventor: Woo Yeol Kim, Gunpo (KR)

(73) Assignee: Hyundai Motor Company, Seoul (KR)

( * ) Notice: Subject to any disclaimer, the term of this patent is extended or adjusted under 35 U.S.C. 154(b) by 97 days.

(21) Appl. No.: 12/466,154

(22) Filed: May 14, 2009

(65) Prior Publication Data

US 2009/0298637 A1    Dec. 3, 2009

(30) Foreign Application Priority Data

May 30, 2008   (KR) .................... 10-2008-0050609

(51) Int. Cl.
*F16H 3/62*    (2006.01)

(52) U.S. Cl. ...................... 475/275; 475/282

(58) Field of Classification Search ................ 475/271, 475/275–292

See application file for complete search history.

(56) References Cited

U.S. PATENT DOCUMENTS

2008/0298639 A1 * 12/2008 Tsunekawa et al. ......... 382/107

* cited by examiner

*Primary Examiner*—David D Le
*Assistant Examiner*—Derek D Knight
(74) *Attorney, Agent, or Firm*—Morgan, Lewis & Bockius LLP (57) ABSTRACT

The present invention provides gear train of an automatic transmission for a vehicle having a first planetary gear set being a double pinion planetary gear set, a second planetary gear set being a single pinion planetary gear set, a third planetary gear set being a Ravigneaux planetary gear set, with five clutches and two brakes, which realizes ten forward speeds and three reverse speeds.

13 Claims, 5 Drawing Sheets

|  | C1 | C2 | C3 | C4 | C5 | B1 | B2 | GEAR RATIO | STEP RATIO |
|---|---|---|---|---|---|---|---|---|---|
| D1 | ● | ● |  |  |  | ● |  | 4.822 |  |
| D2 | ● | ● |  |  |  |  | ● | 2.746 | 1.8 |
| D3 | ● | ● | ● |  |  |  |  | 1.740 | 1.6 |
| D4 | ● |  | ● | ● |  |  |  | 1.457 | 1.2 |
| D5 | ● | ● |  | ● |  |  |  | 1.369 | 1.1 |
| D6 | ● | ● |  |  | ● |  |  | 1.181 | 1.2 |
| D7 |  | ● |  | ● | ● |  |  | 1.000 | 1.2 |
| D8 |  |  | ● | ● | ● |  |  | 0.945 | 1.1 |
| D9 |  | ● |  |  | ● |  |  | 0.829 | 1.2 |
| D10 |  | ● |  |  | ● |  | ● | 0.674 | 1.4 |
| REV 1 |  | ● | ● |  |  | ● |  | -3.591 |  |
| REV 2 |  |  | ● | ● |  | ● |  | -2.346 |  |
| REV 3 |  | ● |  | ● |  | ● |  | -2.064 |  |

GEAR TRAIN OF AUTOMATIC TRANSMISSION FOR A VEHICLE

CROSS-REFERENCE TO RELATED APPLICATION

The present application claims priority to Korean Patent Application Number 10-2008-0050609 filed May 30, 2008, the entire contents of which application is incorporated herein for all purposes by this reference.

BACKGROUND OF THE INVENTION

1. Field of the Invention

The present invention relates to a gear train of an automatic transmission for a vehicle which realizes ten forward speeds by combining two simple planetary gear sets and one compound planetary gear set with five clutches and two brakes.

2. Description of Related Art

A typical shift mechanism of an automatic transmission utilizes a combination of a plurality of planetary gear sets. A gear train of such an automatic transmission that includes the plurality of planetary gear sets changes rotation speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide gear train of an automatic transmission for vehicles having advantages of improving power delivery performance and shifting performance to the reverse speed and reducing fuel consumption as a consequence of combining two simple planetary gear sets and one compound planetary gear set with five clutches and two brakes.

In an aspect of the present invention, a gear train of an automatic transmission for vehicles may include a first planetary gear set being a double pinion planetary gear set and having a first sun gear which always operates as a fixed element, a first ring gear which forms a first intermediate output pathway always outputting a reduced rotation speed, and a first planet carrier which forms an input pathway connected to an input shaft and forms a second intermediate output pathway outputting a rotation speed of the input shaft, a second planetary gear set being a single pinion planetary gear set and having a second sun gear which is selectively connected to the first intermediate output pathway and forms a first variable input pathway, a second planet carrier which forms a third intermediate output pathway and is selectively operated as a fixed element, and a second ring gear which is selectively connected to the second intermediate output pathway and forms a second variable input pathway, wherein a friction element for selectively connecting two rotation elements of the three rotation elements in the second planetary gear set in order to make the second planetary gear set be a direct-coupling state is provided, a third planetary gear set being a Ravigneaux planetary gear set which is formed by combining a single pinion planetary gear set and a double pinion planetary gear set and sharing a ring gear and a planet carrier, and having a third sun gear which is engaged with a long pinion and forms an intermediate input pathway directly connected to the third intermediate output pathway, a fourth sun gear which is engaged with a short pinion and forms a third variable input pathway selectively connected to the first intermediate output pathway, a third planet carrier which forms a fourth variable input pathway by being selectively connected to the input shaft and is selectively operated as a fixed element, and a third ring gear which is connected to an output shaft and forms a final output pathway, and a friction member having the friction element, wherein the friction member includes a plurality of clutches disposed on the first, second, third, and fourth variable input pathways and the second planetary gear set, and a plurality of brakes disposed between the rotation element operated as the fixed element and a transmission housing.

The first sun gear may be fixed to the transmission housing.

The friction member may include a first clutch disposed on the third variable input pathway, a second clutch configured to directly couple the second planetary gear set, wherein the second clutch forms the friction element, a third clutch disposed on the first variable input pathway, a fourth clutch disposed on the second variable input pathway, a fifth clutch disposed on the fourth variable input pathway, a first brake disposed between the third planet carrier and the transmission housing, and a second brake disposed between the second planet carrier and the transmission housing.

The second clutch may be disposed between the second sun gear and the second ring gear.

The second clutch may be disposed between the second sun gear and the second planet carrier.

The second clutch may be disposed between the second planet carrier and the second ring gear.

In another aspect of the present invention, the first and second clutches and the first brake may be operated at a first forward speed, the first and second clutches and the second brake may be operated at a second forward speed, the first, second, and third clutches may be operated at a third forward speed, the first, third, and fourth clutches may be operated at a fourth forward speed, the first, second, and fourth clutches may be operated at a fifth forward speed, the first, second, and fifth clutches may be operated at a sixth forward speed, the second, fourth, and fifth clutches may be operated at a seventh forward speed, the third, fourth, and fifth clutches may be operated at an eighth forward speed, the second, the third and fifth clutches may be operated at a ninth forward speed, the second and fifth clutches and the second brake may be operated at a tenth forward speed, the second and third clutches and the first brake may be operated at a first reverse speed, the third and fourth clutches and the first brake may be operated at a second reverse speed, and the second and fourth clutches and the first brake may be operated at a third reverse speed.

The fourth clutch may be disposed at a front portion of the first planetary gear set, the second and third clutches may be disposed between the first and second planetary gear sets, the first and second brakes may be disposed between the second and third planetary gear sets, and the first and fifth clutches may be disposed at a rear portion of the third planetary gear set.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
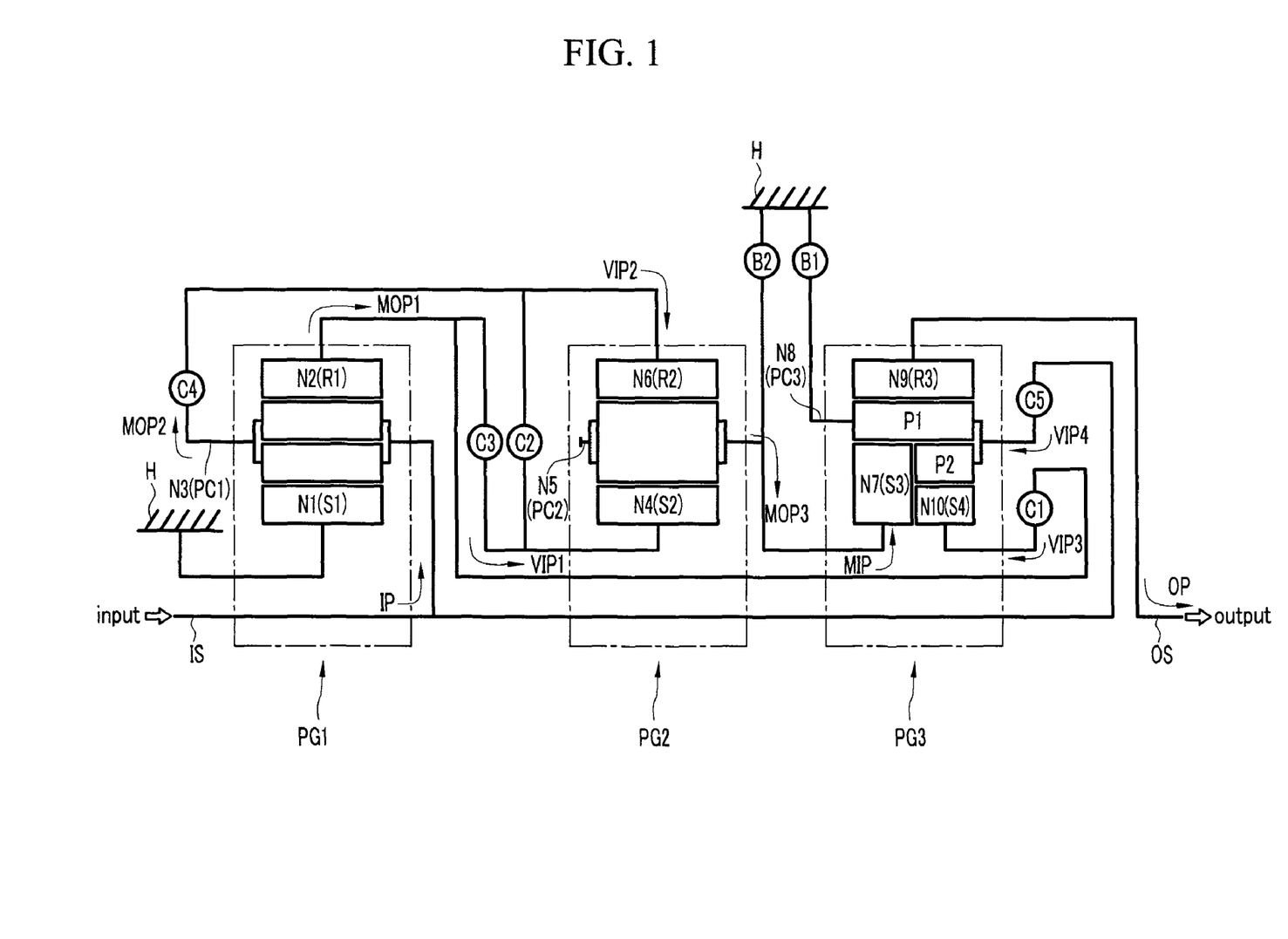
FIG. 1 is a schematic diagram of an exemplary gear train according to the present invention.

FIG. 1 is a schematic diagram of an exemplary gear train according to the present invention.

A gear train according to various embodiments of the present invention includes first, second, and third planetary gear sets PG1, PG2, and PG3 disposed on the same axis, clutch means consisting of first, second, third, fourth, and fifth clutches C1, C2, C3, C4, and C5, and brake means consisting of first and second brakes B1 and B2.

A rotation speed input from an input shaft IS to the first, second, and third planetary gear sets PG1, PG2, and PG3 is changed and is output through an output shaft OS. The first planetary gear set PG1 is disposed close to an engine, and the second and third planetary gear sets PG2 and PG3 are sequentially disposed at the rear of the first planetary gear set PG1.

The input shaft IS is an input member and represents a turbine shaft of a torque converter. Therefore, torque transmitted from a crankshaft of the engine to the torque converter is converted and then input to the gear train through the turbine shaft. The output shaft OS is an output member, and a rotation speed changed in the gear train is transmitted to a well-known differential apparatus through an output gear and is finally transmitted to a drive wheel.

The first planetary gear set PG1 is a double pinion planetary gear set, and has three rotation elements consisting of a sun gear, a planet carrier, and a ring gear. For better comprehension and ease of description, the sun gear of the first planetary gear set PG1 is indicated by a first sun gear S1, the planet carrier of the first planetary gear set PG1 is indicated by a first planet carrier PC1, and the ring gear of the first planetary gear set PG1 is indicated by a first ring gear R1.

In addition, the first sun gear S1 is fixedly connected to a transmission housing H, and the first planet carrier PC1 is directly connected to the input shaft IS in the first planetary gear set PG1.

The first sun gear S1 of a first rotation element N1 is fixedly connected to the transmission housing H and is always operated as a fixed element. The first ring gear R1 of a second rotation element N2 forms a first intermediate output pathway MOP1 and is always operated as an output element that always outputs a reduced rotation speed. The first planet carrier PC1 of the third rotation element N3 is directly connected to the input shaft IS so as to form an input pathway IP and forms a second intermediate output pathway MOP2 that outputs the rotation speed of the input shaft IS as it is.

The second planetary gear set PG2 is a single pinion planetary gear set, and has three rotation elements consisting of a sun gear, a planet carrier, and a ring gear. For better comprehension and ease of description, the sun gear of the second planetary gear set PG2 is indicated by a second sun gear S2, the planet carrier of the second planetary gear set PG2 is indicated by a second planet carrier PC2, and the ring gear of the second planetary gear set PG2 is indicated by a second ring gear R2.

In addition, the second sun gear S2 is selectively connected to the first ring gear R1, and the second ring gear R2 is selectively connected to the first planet carrier PC1 in the second planetary gear set PG2.

The second sun gear S2 of a fourth rotation element N4 forms a first variable input pathway VIP1 that is selectively connected to the first intermediate output pathway MOP1 of the second rotation element N2. The second planet carrier PC2 of the fifth rotation element N4 forms a third intermediate output pathway MOP3 and is selectively connected to the transmission housing H. The second ring gear R2 of the sixth rotation element N6 forms a second variable input pathway VIP2 that is selectively connected to the second intermediate output pathway MOP2 of the third rotation element N3.

The third clutch C3 is disposed on the first variable input pathway VIP1 and torque of the first ring gear R1 is selectively transmitted to the second sun gear S2 by an operation of the third clutch C3. The fourth clutch C4 is disposed on the second variable input pathway VIP2 and torque of the first planet carrier PC1 is selectively transmitted to the second ring gear R2 by an operation of the fourth clutch C4. In addition, the gear train includes the second clutch C2 that selectively connects two rotation elements of the second planetary gear set PG2 with each other such that the second planetary gear set PG2 becomes a direct-coupling state selectively. According to various embodiments of the present invention, the second clutch C2 is disposed between the second sun gear S2 and the second ring gear R2.

In addition, the second planet carrier PC2 is selectively connected to the transmission housing H so as to be operated as a selective fixed element. For this purpose, the second brake B2 is disposed between the second planet carrier PC2 and the transmission housing H.

The third planetary gear set PG3 is a Ravigneaux planetary gear set in which a single pinion planetary gear set and a double pinion planetary gear set are combined by owning a ring gear and a planet carrier jointly.

The third planetary gear set PG3 includes a ring gear, a planet carrier, and two sun gears as rotation elements thereof. For better comprehension and ease of description, the ring gear of the third planetary gear set PG3 is indicated by a third ring gear R3, the planet carrier of the third planetary gear set PG3 is indicated by a third planet carrier PC3, the sun gear engaged with a long pinion P1 of the third planetary gear set PG3 is indicated by a third sun gear S3, the sun gear engaged with a short pinion P2 of the third planetary gear set PG3 is indicated by a fourth sun gear S4.

The third sun gear S3 of a seventh rotation element N7 forms an intermediate input pathway MIP directly connected to the third intermediate output pathway MOP3 of the second planet carrier PC2 and, together with the second planet carrier PC2, is selectively connected to the transmission housing H by an operation of the second brake B2.

The third planet carrier PC3 of an eighth rotation element N8 forms a fourth variable input pathway VIP4 that is selectively connected to the input shaft IS and is operated as a selective fixed element by being selectively connected to the transmission housing H.

The third ring gear R3 of a ninth rotation element N9 forms a final output pathway OP that is directly connected to the output shaft OS.

The fourth sun gear S4 of a tenth rotation element N10 forms a third variable input pathway VIP3 that is selectively connected to the first intermediate output pathway MOP1.

The first clutch C1 is disposed on the third variable input pathway VIP3 and the torque of the first ring gear R1 is selectively transmitted to the fourth sun gear S4 by an operation of the first clutch C1. The fifth clutch C5 is disposed on the fourth variable input pathway VIP4 and the torque of the input shaft IS is selectively transmitted to the third planet carrier PC3 by an operation of the fifth clutch C5.

In addition, the third planet carrier PC3 is operated as a selective fixed element. For this purpose, the first brake B1 is disposed between the third planet carrier PC3 and the transmission housing H.

Here, orders (first, second, third . . . ) of respective clutches and brakes is used for distinguish respective clutches and brakes.

According to various embodiments of the present invention, a rotation speed of the engine transmitted through the input shaft IS is changed into ten forward speeds and third reverse speeds by passing through the first, second, and third planetary gear sets PG1, PG2, and PG3. The ten forward speeds and the third reverse speeds are output through the output shaft OS connected to the final output pathway OP.

The friction elements consisting of the first, second, third, fourth, and fifth clutches C1, C2, C3, C4, and C5 and the first and second brakes B1 and B2 are conventional multi-plate friction elements of wet type that are operated by hydraulic pressure.

The fourth clutch C4 is disposed in front of the first planetary gear set PG1 (close to the engine), the second and third clutches C2 and C3 are disposed between the first and second planetary gear sets PG1 and PG2, the first and second brakes B1 and B2 are disposed between the second and third planetary gear sets PG2 and PG3, and the first and fifth clutches C1 and C5 are disposed at the rear of the third planetary gear set PG3 (farthest from the engine).

If the friction elements are dispersed as described above, formation of hydraulic lines for supplying hydraulic pressure to such friction elements may be simplified, and weight balance in the automatic transmission may be enhanced.

Figure 2:
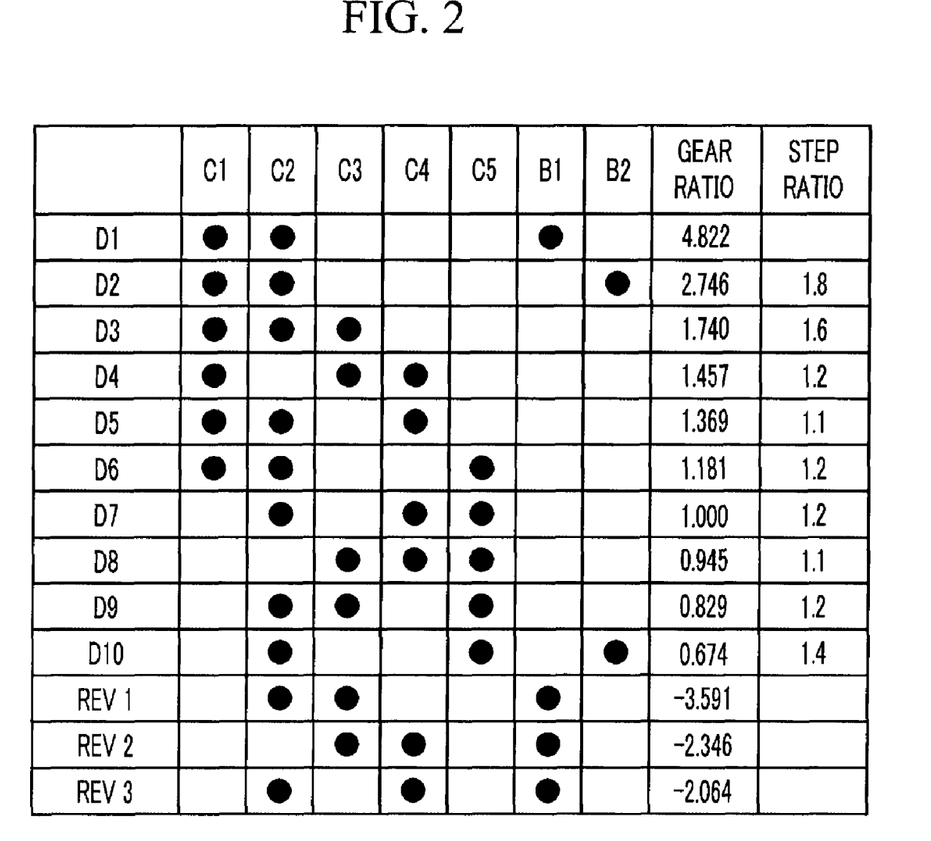
FIG. 2 is a operational chart for an exemplary gear train according to the present invention.

FIG. 2 is an operational chart that shows friction elements (clutches and brakes) operated at each shift speed for various embodiments of the present invention. According to various embodiments of the present invention, three friction members are operated so as to achieve shifting at each shift speed.

That is, the first and second clutches C1 and C2 and the first brake B1 are operated at a first forward speed D1; the first and second clutches C1 and C2 and the second brake B2 are operated at a second forward speed D2; the first, second, and third clutches C1, C2, and C3 are operated at a third forward speed D3; the first, third, and fourth clutches C1, C3, and C4 are operated at a fourth forward speed D4; the first, second, and fourth clutches C1, C2, and C4 are operated at a fifth forward speed D5; the first, second, and fifth clutches C1, C2, and C3 are operated at a sixth forward speed D6; the second, fourth, and fifth clutches C2, C4, and C5 are operated at a seventh forward speed D7; the third, fourth, and fifth clutches C3, C4, and C5 are operated at an eighth forward speed D8; the second, third, and fifth clutches C2, C3, and C5 are operated at a ninth forward speed D9; the second and fifth clutches C2 and C5 and the second brake B2 are operated at a tenth forward speed D10; the second and third clutches C2 and C3 and the first brake B1 are operated at a first reverse speed REV1; the third and fourth clutches C3 and C4 and the first brake B1 are operated at a second reverse speed REV2; and the second and fourth clutches C2 and C4 and the first brake B1 are operated at a third reverse speed REV3.

Figure 3:
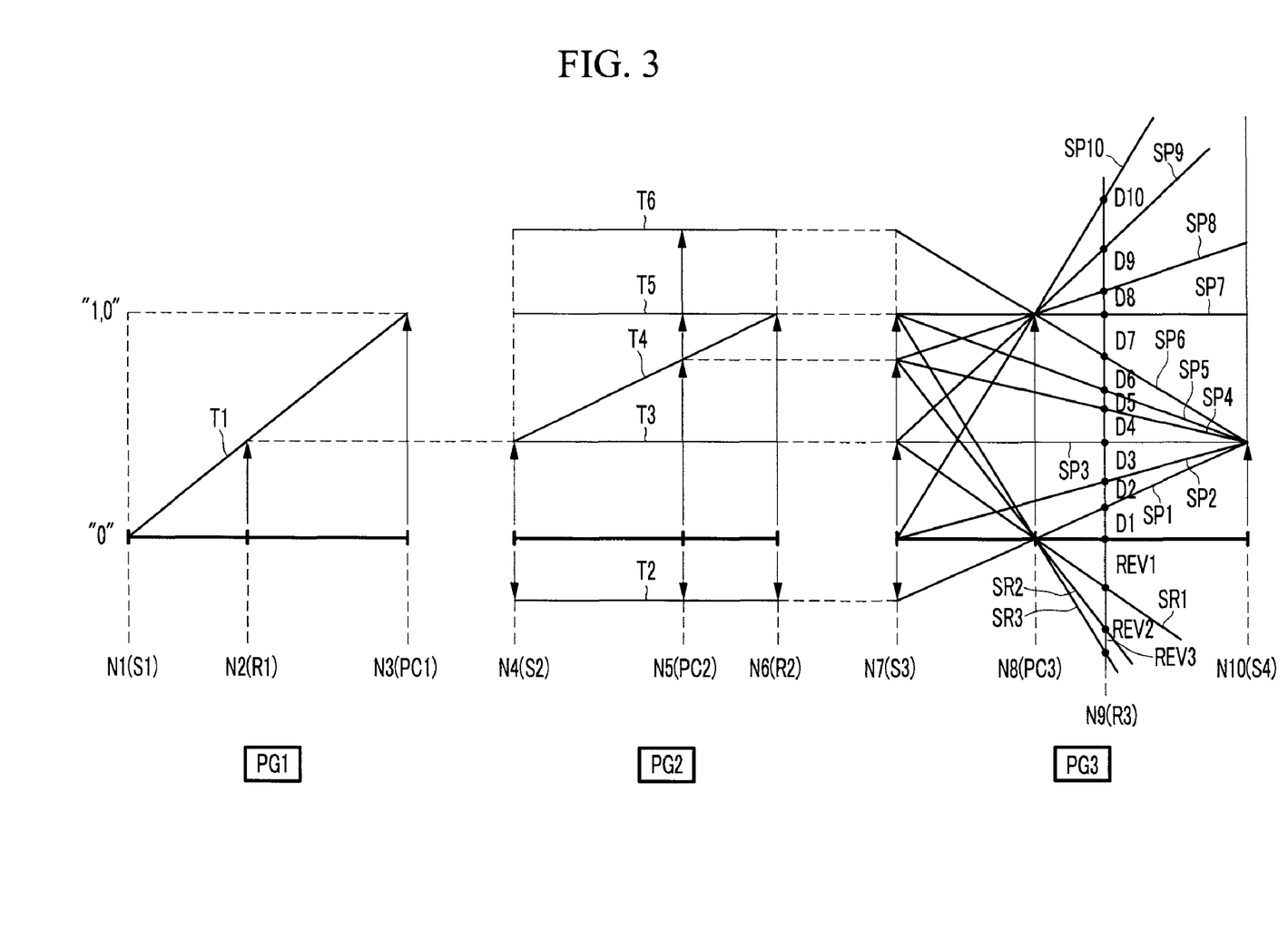
FIG. 3 is a lever diagram for an exemplary gear train according to the present invention.

FIG. 3 is a lever diagram for a gear train according to various embodiments of the present invention. In the drawings, a lower horizontal line represents a rotation speed is "0", and an upper horizontal line represents a rotation speed is "1.0", that is, the rotation speed thereof is the same as that of the input shaft IS.

Three vertical lines of the first planetary gear set PG1 in the drawings represent the first sun gear S1 of the first rotation element N1, the first ring gear R1 of the second rotation element N2, and the first planet carrier PC1 of the third rotation element N3 sequentially from the left, and distances therebetween are set according to a gear ratio of the first planetary gear set PG1 (teeth number of the sun gear/teeth number of the ring gear).

Three vertical lines of the second planetary gear set PG2 in the drawings represent the second sun gear S2 of the fourth rotation element N4, the second planet carrier PC2 of the fifth rotation element N5, and the second ring gear R2 of the sixth rotation element N6 sequentially from the left, and distances therebetween are set according to a gear ratio of the second planetary gear set PG2 (teeth number of the sun gear/teeth number of the ring gear).

Four vertical lines of the third planetary gear set PG3 in the drawings represent the third sun gear S3 of the seventh rotation element N7, the third planet carrier PC3 of the eighth rotation element N8, the third ring gear R3 of the ninth rotation element N9, and the fourth sun gear S4 of the tenth rotation element N10 sequentially from the left, and distances therebetween are set according to a gear ratio of the third planetary gear set PG3 (teeth number of the sun gear/teeth number of the ring gear).

Position of each rotation element in the lever diagram is well known to a person of an ordinary skill in the art who designs a gear train, and thus detailed description will be omitted.

[First Forward Speed]

At the first forward speed D1, the first and second clutches C1 and C2 and the first brake B1 are operated, as shown in FIG. 2.

Accordingly, in a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form a first speed line T1, and the reduced rotation speed is output through the second rotation element N2 forming the first intermediate output pathway MOP1.

Torque of the first intermediate output pathway MOP1 is transmitted to the fourth sun gear S4 of the tenth rotation element N10 forming the third variable input pathway VIP3 by the operation of the first clutch C1.

In this case, in a state that the reduced rotation speed is input to the tenth rotation element N10, the eighth rotation element N8 is operated as the fixed element by the operation of the first brake B1 in the third planetary gear set PG3. Therefore, rotation elements of the third planetary gear set PG3 form a first shift line SP1, and the first forward speed D1 where the first shift line SP1 and the vertical line of the ninth rotation element N9 intersect is output. The maximum gear ratio (the rotation speed of the input shaft IS/the rotation speed of the output shaft OS) can be achieved at the first forward speed D1 and is "4.822".

At this time, the second planetary gear set PG2 becomes the direct-coupling state by the operation of the second clutch C2, and a reverse rotation speed is input through the second planet carrier PC2 fixedly connected to the third sun gear S3 of the seventh rotation element N7. All rotation elements of the second planetary gear set PG2 rotate in an opposite direction according to a second speed line T2.

[Second Forward Speed]

At the second forward speed D2, the first brake B1 is released and the second brake B2 is operated in a state of the first forward speed D1.

In a state that the torque of the input shaft IS is input to the third rotation element N3 that forms input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the fourth sun gear S4 of the tenth rotation element N10 forming the third variable input pathway VIP3 by the operation of the first clutch C1.

In addition, since the seventh rotation element N7 is operated as the fixed element by the operation of the second brake B2, the rotation elements of the third planetary gear set PG3 form a second shift line SP2. Therefore, the second forward speed D2 where the second shift line SP2 and the vertical line of the ninth rotation element N9 intersect is output. Gear ratio of the second forward speed D2 is "2.746" that is smaller than that of the first forward speed D1.

At this time, the second planetary gear set PG2 becomes the direct-coupling state and the second brake B2 is operated. Therefore, all rotation elements of the second planetary gear set PG2 are stopped.

[Third Forward Speed]

At the third forward speed D3, the second brake B2 is released and the third clutch C3 is operated in a state of the second forward speed D2.

In a state that the torque of the input shaft IS is input to the third rotation element N3 that forms input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the second planetary gear set PG2 through the fourth rotation element N4 forming the first variable input pathway VIP1 by the operation of the third clutch C3 and is transmitted to the tenth rotation element N10 forming the third variable input pathway VIP3 by the operation of the first clutch C1.

In a state that the reduced rotation speed is input to the fourth rotation element N4, the second planetary gear set PG2 becomes the direct-coupling state by the operation of the second clutch C2. Therefore, the rotation elements of the second planetary gear set PG2 form a third speed line T3 and the reduced rotation speed is transmitted to the third sun gear S3 of the seventh rotation element N7 through the intermediate input pathway MIP.

In this case, since the reduced rotation speed is input simultaneously to the seventh rotation element N7 and the tenth rotation element N10, the third planetary gear set PG3 becomes the direct-coupling state and all rotation elements of the third planetary gear set PG3 form a third shift line SP3. Therefore, the third forward speed D3 where the third shift line SP3 and the vertical line of the ninth rotation element N9 intersect is output. Gear ratio of the third forward speed D3 is "1.740" that is smaller than that of the second forward speed D2.

[Fourth Forward Speed]

At the fourth forward speed D4, the second clutch C2 is released and the fourth clutch C4 is operated in a state of the third forward speed D3.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the fourth rotation element N4 forming the first variable input pathway VIP1 by the operation of the third clutch C3 and is transmitted to the tenth rotation element N10 forming the third variable input pathway VIP3 by an operation of the first clutch C1.

In a state that the reduced rotation speed is input to the fourth rotation element N4, the rotation speed of the input shaft IS is input to the second planetary gear set PG2 through the second variable input pathway VIP2 by the operation of the fourth clutch C4. Therefore, the rotation elements of the second planetary gear set PG2 form a fourth speed line T4, and torque output through the fifth rotation element N5 forming the third intermediate output pathway MOP3 is input to the seventh rotation element N7 through the intermediate input pathway MIP.

In a state that the reduced rotation speed is input to the tenth rotation element N10, the torque of the fifth rotation element N5 is input to the seventh rotation element N7 in the third planetary gear set PG3. Therefore, the rotation elements of the third planetary gear set PG3 form a fourth shift line SP4, and the fourth forward speed D4 where the fourth shift line SP4 and the vertical line of the ninth rotation element N9 intersect is output. Gear ratio of the fourth forward speed D4 is "1.457" that is smaller than that of the third forward speed D3.

[Fifth Forward Speed]

At the fifth forward speed D5, the third clutch C3 is released and the second clutch C2 is operated in a state of the fourth forward speed D4.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the tenth rotation element N10 forming the third variable input pathway VIP3 by the operation of the first clutch C1.

In a state that the second planetary gear set PG2 is the direct-coupling state by the operation of the second clutch C2, the rotation speed of the input shaft IS is input to the sixth rotation element N6 by the operation of the fourth clutch C4. Therefore, the rotation elements of the second planetary gear set PG2 form a fifth speed line T5 and the rotation speed of the input shaft IS is transmitted to the seventh rotation element N7 through the intermediate input pathway MIP1.

In a state that the reduced rotation speed is input to the tenth rotation element N10, the rotation speed of the input shaft IS is input to the seventh rotation element N7 in the third planetary gear set PG3. Therefore, the rotation elements of the third planetary gear set PG3 form a fifth shift line SP5, and the fifth forward speed D5 where the fifth shift line SP5 and the vertical line of the ninth rotation element N9 intersect is output. Gear ratio of the fifth forward speed D5 is "1.369" that is smaller than that of the fourth forward speed D4.

[Sixth Forward Speed]

At the sixth forward speed D6, the fourth clutch C4 is released and the fifth clutch C5 is operated in a state of the fifth forward speed D5.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the tenth rotation element N10 forming the third variable input pathway VIP3 by the operation of the first clutch C1.

In a state that the reduced rotation speed is input to the tenth rotation element N10, the rotation speed of the input shaft IS is input to the eighth rotation element N8 through the fourth variable input pathway VIP4 by the operation of the fifth clutch C5. Therefore, the rotation elements of the third planetary gear set PG3 form a sixth shift line SP6, and the sixth forward speed D6 where the sixth shift line SP6 and the vertical line of the ninth rotation element N9 intersect is output. Gear ratio of the sixth forward speed D6 is "1.181" that is smaller than that of the fifth forward speed D5.

At this time, the second planetary gear set PG2 becomes the direct-coupling state by the operation of the second clutch C2, and the torque of the seventh rotation element N7 is transmitted to the fifth rotation element N5. Therefore, all rotation elements of the second planetary gear set PG2 form a sixth speed line T6 which represents all rotation elements of the secondary planetary gear set PG2 are an overdrive-state.

[Seventh Forward Speed]

At the seventh forward speed D7, the first clutch C1 is released and the fourth clutch C4 is operated in a state of the sixth forward speed D6.

In this case, the rotation speed of the input shaft IS is transmitted to the sixth rotation element N6 of the second planetary gear set PG2 by the operation of the fourth clutch C4 and the second planetary gear set PG2 becomes the direct-coupling state by the operation of the second clutch C2. Therefore, the rotation speed of the input shaft IS is transmitted to the seventh rotation element N7 through the third intermediate output pathway MOP3 and the intermediate input pathway MIP.

Since the rotation speed of the input shaft IS is input to the eighth rotation element N8 by the operation of the fifth clutch C5, the third planetary gear set PG3 becomes the direct-coupling state. Therefore, all rotation elements of the third planetary gear set PG3 form a seventh shift line SP7 that is the same as the rotation speed of the input shaft IS, the seventh forward speed D7 is output through the ninth rotation element N9 that is the output element. Gear ratio of the seventh forward speed D7 is "1.000".

[Eighth Forward Speed]

At the eighth forward speed D8, the second clutch C2 is released and the third clutch C3 is operated in a state of the seventh forward speed D7.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is input to the fourth rotation element N4 forming the first variable input pathway VIP1 by the operation of the third clutch C3, and the rotation speed of the input shaft IS is input to the sixth rotation element N6 by the operation of the fourth clutch C4. Therefore, rotation elements of the second planetary gear set PG2 form the fourth speed line T4, and the torque of the fifth rotation element N5 forming the third intermediate output pathway MOP3 is transmitted to the seventh rotation element N7 through the intermediate input pathway MIP.

In a state that the torque of the fifth rotation element N5 is input to the seventh rotation element N7, the rotation speed of the input shaft IS is input to the eighth rotation element N8 in the third planetary gear set PG3 by the operation of the fifth clutch C5. Therefore, the rotation elements of the third planetary gear set PG3 form an eighth shift line SP8, and the eighth forward speed D8 where the eighth shift line SP8 and the vertical line of the ninth rotation element N9 intersect is output. The eighth forward speed D8 is the overdrive state and gear ratio thereof is "0.945".

[Ninth Forward Speed]

At the ninth forward speed D9, the fourth clutch C4 is released and the second clutch C2 is operated in a state of the eighth forward speed D8.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the fourth rotation element N4 forming the first variable input pathway VIP by the operation of the third clutch C3, and the second planetary gear set PG2 becomes the direct-coupling state by the operation of the second clutch C2. Therefore, the reduced rotation speed is transmitted to the seventh rotation element N7 forming the intermediate input pathway MIP through the third intermediate output pathway MOP3.

In a state that the reduced rotation speed is input to the seventh rotation element N7, the rotation speed of the input shaft IS is input to the eighth rotation element N8 in the third planetary gear set PG3 by the operation of the fifth clutch C5. Therefore, the rotation elements of the third planetary gear set PG3 form a ninth shift line SP9, and the ninth forward speed D9 where the ninth shift line SP9 and the vertical line of the ninth rotation element N9 intersect is output. Gear ratio of the ninth forward speed D9 is "0.829" that is smaller than that of the eighth forward speed D8.

[Tenth Forward Speed]

At the tenth forward speed D10, the third clutch C3 is released and the second brake B2 is operated in a state of the ninth forward speed D9.

In a state that the rotation speed of the input shaft IS is input to the eighth rotation element N8 by the operation of the fifth clutch C5, the seventh rotation element N7 is operated as the fixed element in the third planetary gear set PG3 by the operation of the second brake B2. Therefore, rotation elements of the third planetary gear set PG3 form a tenth shift line SP10, and the tenth forward speed D10 where the tenth shift line SP10 and the vertical line of the ninth rotation element N9 intersect is output. Gear ratio of the tenth forward speed D10 is "0.674" that is smaller than that of the ninth forward speed D9.

[First Reverse Speed]

At the first reverse speed REV1, the second and third clutches C2 and C3 and the first brake B1 are operated as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the fourth rotation element N4 forming the first variable input pathway VIP by the operation of the third clutch C3, and the second planetary gear set PG2 becomes the direct-coupling state by the operation of the second clutch C2. Therefore, the reduced rotation speed is transmitted to the seventh rotation element N7 forming the intermediate input pathway MIP through the third intermediate output pathway MOP3.

In a state that the reduced rotation speed is input to the seventh rotation element N7, the eighth rotation element N8 is operated as the fixed element in the third planetary gear set PG3 by the operation of the first brake B1. Therefore, the rotation elements of the third planetary gear set PG3 form a first reverse shift line SR1, and the first reverse speed REV1 where the first reverse shift line SR1 and the vertical line of the ninth rotation element N9 intersect is output. Gear ratio of the first reverse speed REV1 is "−3.591". Here, "−" sign means reverse rotation speed.

[Second Reverse Speed]

At the second reverse speed REV2, the second clutch C2 is released and the fourth clutch C4 is operated in a state of the first reverse speed REV1.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the fourth rotation element N4 forming the first variable input pathway VIP by the operation of the third clutch C3, and the rotation speed of the input shaft IS is transmitted to the sixth rotation element N6 through the second variable input pathway VIP2 by the operation of the fourth clutch C4. Therefore, the rotation elements of the second planetary gear set PG2 form the fourth speed line T4, and the torque of the fifth rotation element N5 forming the third intermediate output pathway MOP3 is transmitted to the seventh rotation element N7 through the intermediate input pathway MIP.

In a state that the torque of the fifth rotation element N5 is input to the seventh rotation element N7, the eighth rotation element N8 is operated as the fixed element by the operation of the first brake B1. Therefore, the rotation elements of the third planetary gear set PG3 form a second reverse shift line SR2, and the second reverse speed REV2 where the second reverse shift line SR2 and the vertical line of the ninth rotation element N9 intersect is output. Gear ratio of the second reverse speed REV2 is "−2.346".

[Third Reverse Speed]

At the third reverse speed REV3, the third clutch C3 is released and the second clutch C2 is operated in a state of the second reverse speed REV2.

In a state that the rotation speed of the input shaft IS is transmitted to the sixth rotation element N6 of the second planetary gear set PG2 by the operation of the fourth clutch C4, the second planetary gear set PG2 becomes the direct-coupling state by the operation of the second clutch C2. Therefore, the rotation speed of the input shaft IS is transmitted to the seventh rotation element N7 through the third intermediate output pathway MOP3 and the intermediate input pathway MIP.

In a state that the rotation speed of the input shaft IS is transmitted to the seventh rotation element N7, the eighth rotation element N8 is operated as the fixed element by the operation of the first brake B1. Therefore, the rotation elements of the third planetary gear set PG3 form the third reverse shift line SR3, and the third reverse speed REV3 where the third reverse shift line SR3 and the vertical line of the ninth rotation element N9 intersect is output. Gear ratio of the third reverse speed REV3 is "−2.346".

Figure 4:
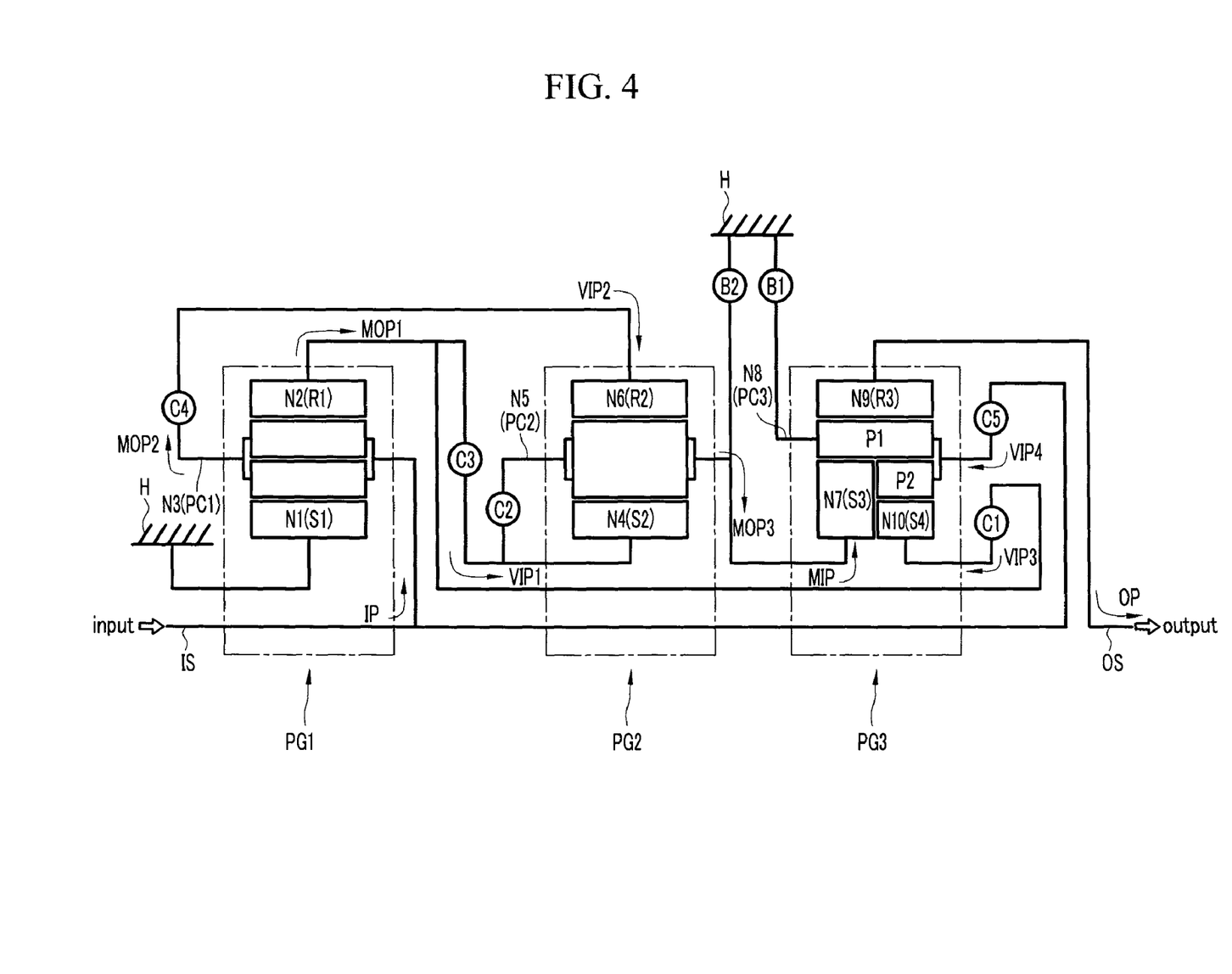
FIG. 4 is a schematic diagram of another exemplary gear train according to the present invention.
Figure 5:
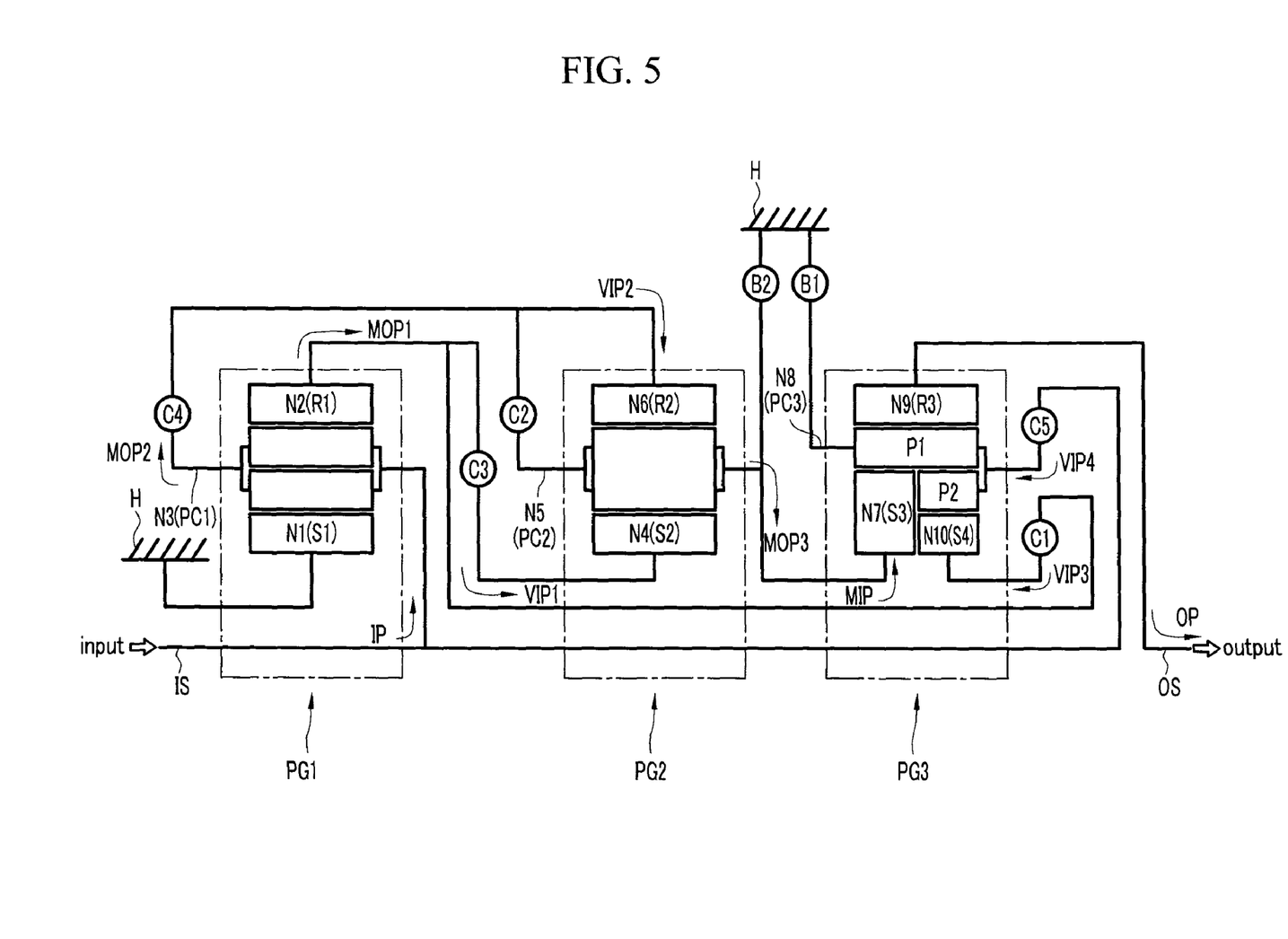
FIG. 5 is a schematic diagram of another exemplary gear train according to the present invention.

FIG. 4 and FIG. 5 show gear trains according to other embodiments of the present invention. Structures of such embodiments may be the same as that of the above described embodiment(s), but the second clutch C2 that makes the second planetary gear set PG2 be the direct-coupling state is differently disposed.

That is, according to various embodiments, the second clutch C2 is disposed between the second sun gear S2 of the fourth rotation element N4 and the second planet carrier PC2 of the fifth rotation element N5 as shown in FIG. 4. In addition, according to other embodiments, the second clutch C2 is disposed between the second planet carrier PC2 of the fifth rotation element N5 and the second ring gear R2 of the sixth rotation element N6 as shown in FIG. 5.

The second clutch C2 is differently disposed in various embodiments, but may perform the same role of making the second planetary gear set PG2 be the direct-coupling state. Thus, shift processes of various embodiments may be the same as those of a first described embodiment, and the detailed description will be omitted, accordingly.

Since various embodiments of the present invention realize ten forward speeds and three reverse speeds by combining the first and second planetary gear sets PG1 and PG2 of two simple planetary gear sets and the third planetary gear set PG3 of the compound planetary gear set with five clutches C1, C2, C3, C4, and C5 and two brakes B1 and B2 of the friction elements, power delivery performance and fuel mileage may be improved.

Since the plurality of friction elements are dispersed, formation of hydraulic lines may be simplified.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for a vehicle comprising:
    a first planetary gear set being a double pinion planetary gear set and having a first sun gear which always operates as a fixed element, a first ring gear which forms a first intermediate output pathway always outputting a reduced rotation speed, and a first planet carrier which forms an input pathway connected to an input shaft and forms a second intermediate output pathway outputting a rotation speed of the input shaft;
    a second planetary gear set being a single pinion planetary gear set and having a second sun gear which is selectively connected to the first intermediate output pathway and forms a first variable input pathway, a second planet carrier which forms a third intermediate output pathway and is selectively operated as the fixed element, and a second ring gear which is selectively connected to the second intermediate output pathway and forms a second variable input pathway, wherein a friction element for selectively connecting two rotation elements of the three rotation elements in the second planetary gear set in order to make the second planetary gear set be a direct-coupling state is provided;
    a third planetary gear set being a Ravigneaux planetary gear set which is formed by combining a single pinion planetary gear set and a double pinion planetary gear set and sharing a ring gear and a planet carrier, and having a third sun gear which is engaged with a long pinion and forms an intermediate input pathway directly connected to the third intermediate output pathway, a fourth sun gear which is engaged with a short pinion and forms a third variable input pathway selectively connected to the first intermediate output pathway, a third planet carrier which forms a fourth variable input pathway by being selectively connected to the input shaft and is selectively operated as a fixed element, and a third ring gear which is connected to an output shaft and forms a final output pathway; and
    a friction member comprising the friction element, wherein the friction member includes a plurality of clutches disposed on the first, second, third, and fourth variable input pathways and the second planetary gear set, and a plurality of brakes disposed between the rotation element operated as the fixed element and a transmission housing.

2. The gear train of claim 1, wherein the first sun gear is fixed to the transmission housing.

3. The gear train of claim 1, wherein the friction member comprises:
    a first clutch disposed on the third variable input pathway;
    a second clutch configured to directly couple the second planetary gear set, wherein the second clutch forms the friction element;
    a third clutch disposed on the first variable input pathway;
    a fourth clutch disposed on the second variable input pathway;
    a fifth clutch disposed on the fourth variable input pathway;
    a first brake disposed between the third planet carrier and the transmission housing; and
    a second brake disposed between the second planet carrier and the transmission housing.

4. The gear train of claim 3, wherein the second clutch is disposed between the second sun gear and the second ring gear.

5. The gear train of claim 3, wherein the second clutch is disposed between the second sun gear and the second planet carrier.

6. The gear train of claim 3, wherein the second clutch is disposed between the second planet carrier and the second ring gear.

7. The gear train of claim 3, wherein
    the first and second clutches and the first brake are operated at a first forward speed,
    the first and second clutches and the second brake are operated at a second forward speed,
    the first, second, and third clutches are operated at a third forward speed,
    the first, third, and fourth clutches are operated at a fourth forward speed,
    the first, second, and fourth clutches are operated at a fifth forward speed,
    the first, second, and fifth clutches are operated at a sixth forward speed,
    the second, fourth, and fifth clutches are operated at a seventh forward speed,
    the third, fourth, and fifth clutches are operated at an eighth forward speed,
    the second, the third and fifth clutches are operated at a ninth forward speed,
    the second and fifth clutches and the second brake are operated at a tenth forward speed,
    the second and third clutches and the first brake are operated at a first reverse speed,
    the third and fourth clutches and the first brake are operated at a second reverse speed, and
    the second and fourth clutches and the first brake are operated at a third reverse speed.

8. The gear train of claim 3, wherein the fourth clutch is disposed at a front portion of the first planetary gear set, the second and third clutches are disposed between the first and second planetary gear sets, the first and second brakes are disposed between the second and third planetary gear sets, and the first and fifth clutches are disposed at a rear portion of the third planetary gear set.

9. The gear train of claim 3, wherein the fourth clutch is disposed at a front portion of the first planetary gear set.

10. The gear train of claim 3, wherein the second and third clutches are disposed between the first and second planetary gear sets.

11. The gear train of claim 3, wherein the first and second brakes are disposed between the second and third planetary gear sets.

12. The gear train of claim 3, wherein the first and fifth clutches are disposed at a rear portion of the third planetary gear set.

13. A passenger vehicle comprising the gear train of an automatic transmission of claim 1.

* * * * *